Sept. 4, 1956  I. JEPSON  2,761,375
AUTOMATIC EGG COOKER
Filed April 14, 1950  3 Sheets-Sheet 1
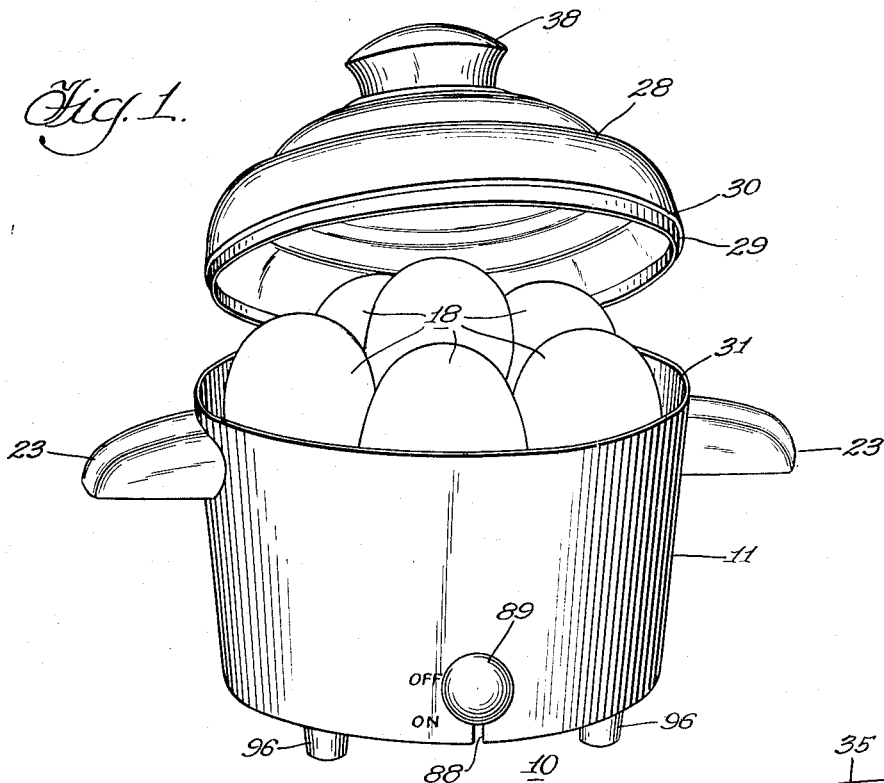
Fig. 1.
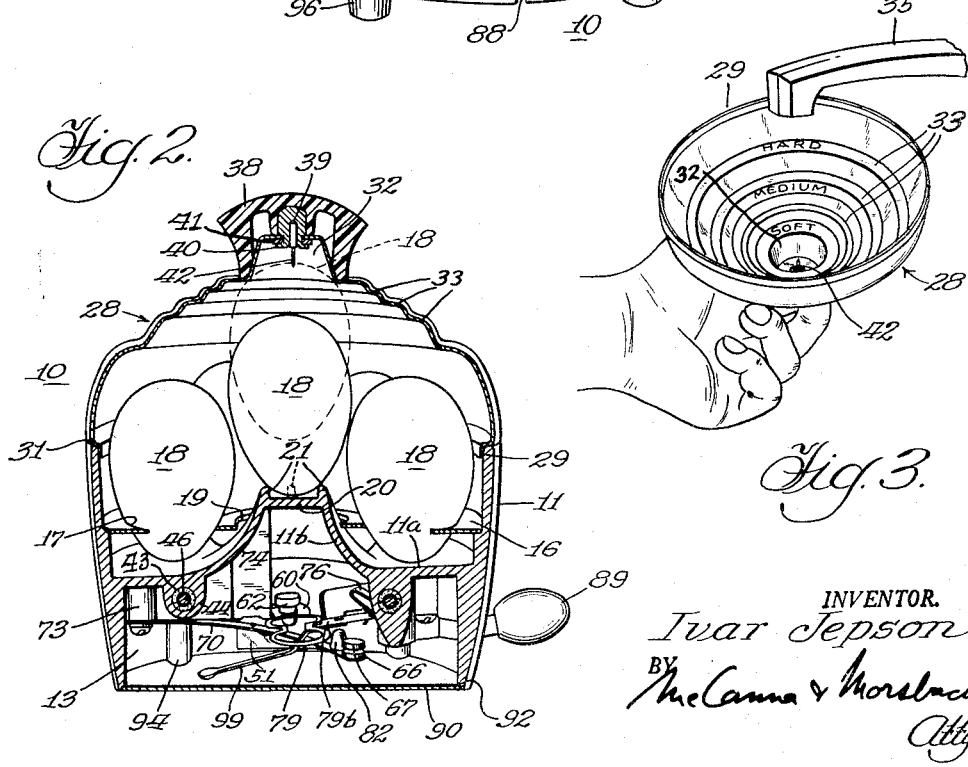
Fig. 2.
Fig. 3.
INVENTOR.
Ivar Jepson
BY McCanna & Morsbach
Attys.

Sept. 4, 1956           I. JEPSON           2,761,375
AUTOMATIC EGG COOKER
Filed April 14, 1950                                    3 Sheets—Sheet 2
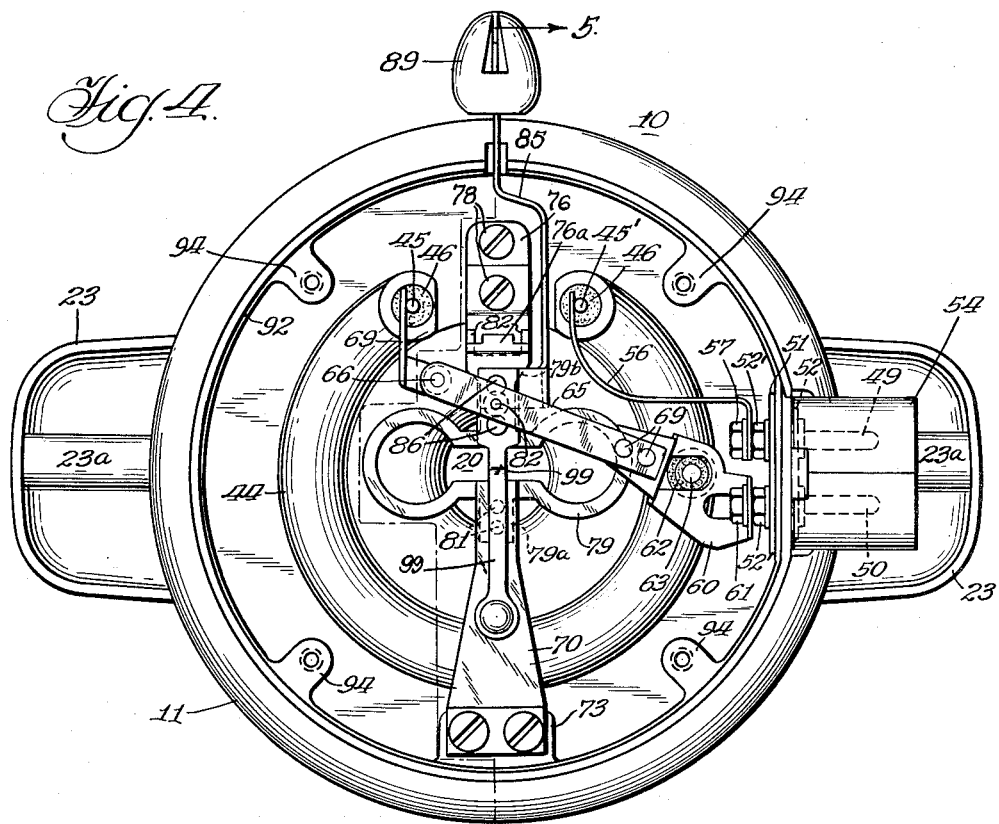
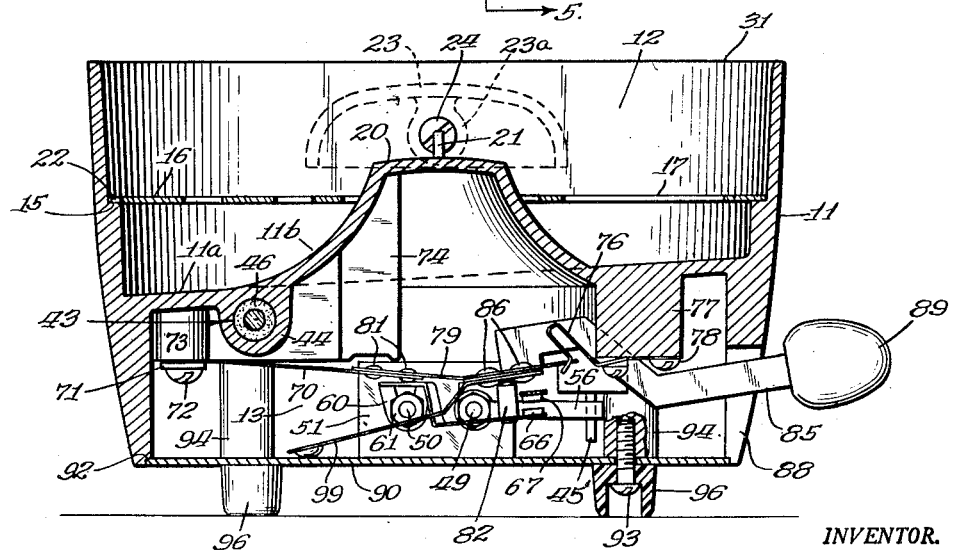
INVENTOR.
Ivar Jepson
BY McCanna & Morsbach
Attys.

Sept. 4, 1956  I. JEPSON  2,761,375
AUTOMATIC EGG COOKER
Filed April 14, 1950  3 Sheets-Sheet 3

INVENTOR.
Ivar Jepson
BY McCanna & Morsbach
Attys.

United States Patent Office 2,761,375
Patented Sept. 4, 1956

2,761,375

AUTOMATIC EGG COOKER

Ivar Jepson, Oak Park, Ill., assignor to Sunbeam Corporation, Chicago, Ill., a corporation of Illinois Application April 14, 1950, Serial No. 155,977

3 Claims. (Cl. 99—344)

The present invention relates to an automatic cooking device and more particularly to an automatic egg cooker.

Numerous devices have been heretofore proposed for automatically cooking eggs in a manner so the exact desired degree of cooking may always be obtained. Such prior art devices have been complicated, bulky and unwieldy and have not found favor with the housewife or other persons attempting to cook eggs. For use in a normal home, an egg cooker should be capable of cooking from one to six eggs at a time, and the device for accomplishing this purpose should be simple and compact so that it does not require a large storage space when not in use.

It is well known that eggs are conventionally kept under considerably different conditions at various times. For example, the housewife may desire to cook eggs by taking the eggs directly from a refrigerator so that the eggs themselves are originally at a relatively low temperature. At other times the eggs may be at room temperature or at times even at a more elevated temperature than room temperature. A satisfactory egg cooker should be capable of cooking such eggs to the desired degree regardless of the initial temperature thereof, and furthermore should be capable of repeating the process to produce the same finished product time after time. Such an egg cooker should furthermore have means for initiating operation thereof, after which it shuts itself off when the eggs are properly cooked without any further attention from the operator. In addition, the egg cooker should provide means whereby no cracking or damage to the eggs occurs during use. Although egg shells are capable of withstanding some 45 to 50 pounds of pressure per square inch, it is common practice in boiling eggs to have the shells break, whereupon the contents may spread throughout the cooking vessel causing a very difficult cleaning problem and being generally very undesirable.

Although such an egg cooker may generally be utilized for boiling eggs to different degrees, it would be desirable to provide such an egg cooker which is also capable of poaching eggs if so desired, and which can be converted from a device for automatically boiling eggs to one for automatically poaching eggs with little or no change and employing the same general operating principle.

Accordingly, it is an object of the present invention to provide a new and improved automatic cooking utensil, particularly well adapted for cooking eggs.

It is another object of the present invention to provide a cooking utensil of new and improved construction comprising a die cast container of simplified construction, requiring a minimum of insulation for insulating electrical control means associated therewith.

It is another object of the present invention to provide an automatic egg cooker of very compact construction including unique means for supporting a maximum number of eggs in a minimum space.

Still another object of the present invention comprises an automatic egg cooking device having a receptacle with an inclined bottom for the purpose of accurately controlling, through thermostatic means, the end condition of the eggs cooked therewith.

It is a further object of the present invention to provide an automatic egg cooker of pleasing design and appearance, including a cover having means for measuring various quantities of water to be employed to determine the ultimate end condition of the eggs, which design insures very accurate timing of the cooking interval even for short cooking intervals.

Still a further object of the present invention is the provision of a shell piercing needle in an automatic egg cooker positioned so that the shell of the egg may be pierced without other damage to the egg, to insure the escape of gas pressures which might be formed within the shell and thereby prevent breaking of the egg shell during cooking thereof.

It is another object of the present invention to provide in an automatic egg cooker interchangeable means for automatically boiling or poaching eggs at the selection of the operator.

It is another object of the present invention to provide an automatic egg cooker which will produce any desired degree of cooking of the eggs regardless of the temperature of the eggs initially before being placed in the egg cooker.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

Fig. 1 is a perspective view with the cover partially removed of an egg cooker embodying the present invention shown with the maximum number of eggs disposed therein for cooking;

Fig. 2 is a somewhat perspective sectional view taken through the egg cooker of Fig. 1 showing the eggs and the cover thereof in the normal position for a cooking operation;

Fig. 3 is a perspective view illustrating one step in the process of employing the egg cooker of the present invention;

Fig. 4 is a bottom view of the egg cooker shown in Fig. 1 with the base plate thereof removed more clearly to illustrate the control mechanism of the present invention;

Fig. 5 is a sectional view taken on line 5—5 of Fig. 4 assuming the bottom plate is in position and with certain other parts shown in section, more clearly to illustrate the present invention;

Figure 6:
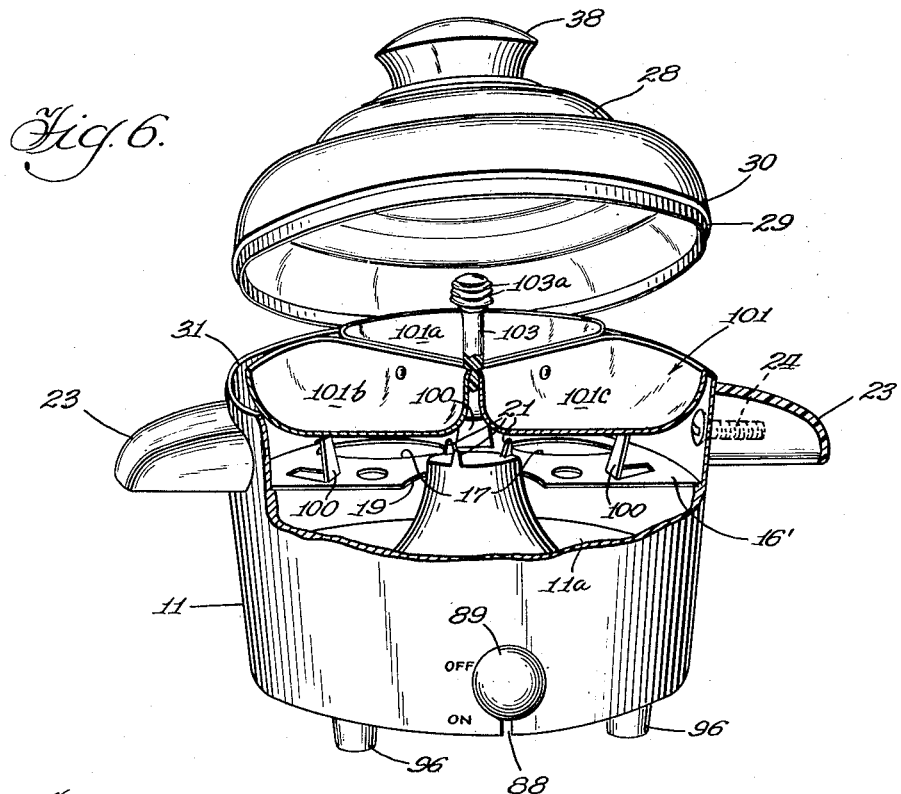
Fig. 6 is a perspective view similar to Fig. 1 with certain portions cut away to illustrate the use of the egg cooker for poaching eggs.

The automatic egg cooking device of the present invention provides an arrangement whereby anyone and everyone can cook eggs to suit their own taste automatically and with every attempt. The degree of hardness or softness to which the eggs are cooked depends entirely upon the amount of water used, if the same amount of water is used every time, the eggs will be cooked exactly the same every time, whether the eggs are at room temperature to begin with or are taken directly from the refrigerator. The egg cooker comprises a receptacle having an inclined bottom and means for supporting a plurality of eggs in a minimum space. The egg cooker includes means for piercing each egg at the place where the air pocket in the egg is located to keep the eggs from swelling and cracking during the cooking operation. The cover includes measuring means for measuring the proper amount of water and when this water has all evaporated a thermostat responsive to the temperature of the lowest level of the inclined bottom of the receptacle cuts off the heating circuit. As long as any water is disposed over the thermostat, its temperature is limited to the boiling temperature of water, but upon evaporation of all of the water, the temperature rises rapidly to effect operation of the thermostatic control. Means for indicating the termination of the cooking operation are provided since obviously if the eggs are left in the cooker without opening or being cooled off, the heat stored within the eggs themselves will cause further cooking. When it is desired to poach eggs instead of boiling them, the poaching tray may be supported within the egg cooker and the same process of automatic heating employed.

Referring now to the drawings, there is illustrated an egg cooker generally indicated at 10, which comprises a body 11, preferably formed of die cast aluminum or the like, which defines an upper cooking chamber or receptacle 12 and a lower mechanism or control chamber 13 separated from each other by a floor or wall portion 11a integrally cast with the body 11. As illustrated, there is provided within the upper chamber 12, a circumferential ledge 15 for supporting an egg locating disc 16 having a plurality of openings 17 defined therein for supporting or locating the eggs to be cooked such as 18, best shown in Fig. 2 of the drawings. The openings 17 are of such diameter as to receive only the small ends of the eggs, and the disc 16 is supported sufficiently above the floor 11a so that the eggs 18 do not touch this floor at any time.

Figure 7:
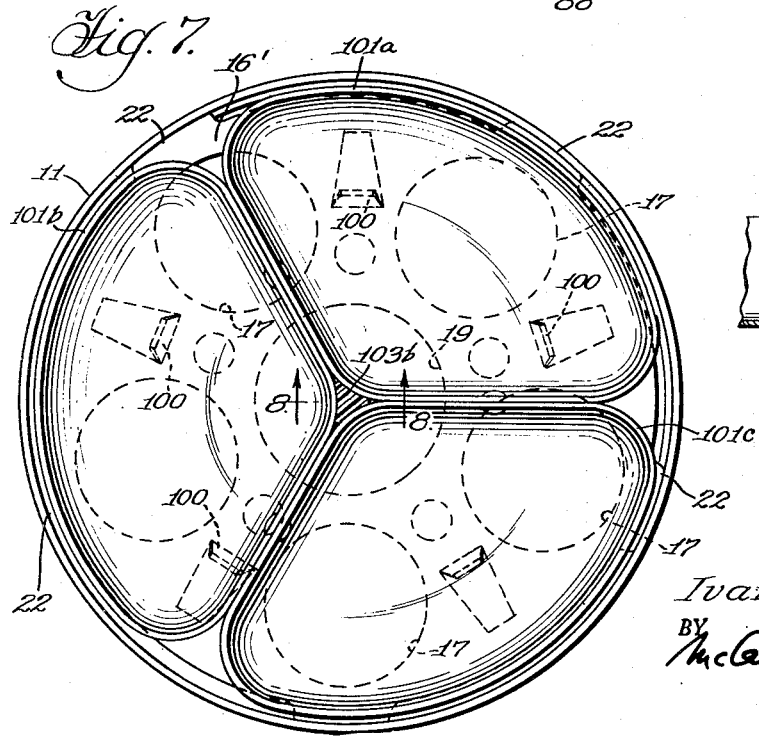
Fig. 7 is a top view of the egg cooker of Fig. 6 with the cover removed and certain portions cut away to show the details of the poaching pan and support therefor.

For the purpose of supporting a maximum number of eggs in a minimum space whereby it is possible to maintain the diameter of the body 11 at a minimum, the disc 16 is provided with five egg receiving openings 17 arranged in a circle as clearly shown in Fig. 7 of the drawings. In order to support a sixth egg, the floor 11a is provided with a raised central portion 20 integrally formed with the body 11 which is adapted to extend through central openings 19 in the disc 16 when the latter is in position on the ledge 15. This raised central portion 20 further includes a plurality of integral upwardly extending prongs 21 for supporting the small end of a sixth egg in a sufficiently raised position so that the diameter of a circle running through the centers of the openings 17 may be maintained at a minimum. Thus, it will be observed by examining Figs. 1 and 2 of the drawings that six eggs are disposed within a very small container by virtue of the fact that the sixth egg is supported centrally of the others and in a raised position so that the smaller diameter portion of the small end of this center egg is disposed between the other five eggs and the maximum diameter of this center egg is disposed above the line of maximum diameters of the other eggs. Preferably the raised platform or support 20 is united with the floor 11a of the body 11 by smoothly sloping somewhat conical shaped wall portions 11b to facilitate easy cleaning of the walls defining cooking chamber 12 upon removal of the disc 16. Preferably also the disc 16, to permit easy removal thereof, is provided with a plurality of ears 22, best shown in Fig. 7 of the drawings, which engage the ledge 15.

For the purpose of handling the body 11, it is provided with handles 23 formed of molded plastic insulating material or the like. As illustrated, the handles 23 have a somewhat cup-shaped configuration with an arcuate end so as to conform to the shape of the body 11 as is clearly shown in Figs. 1, 4 and 5 of the drawings. Disposed within the cup-shaped portion of each handle 23 is an enlarged rib 23a which is tapped to receive a suitable screw or fastening means 24 extending through the walls defining the upper chamber or receptacle 12. By virtue of the shape of the handles to conform to the outside configuration of the body 11, a single screw 24 firmly holds each handle in place and twisting thereof is prevented by virtue of such configuration.

For the purpose of limiting the escape of steam from the chamber 12 during the egg cooking operation, there is provided a cover 28 provided with an integral peripheral flange 29 defining a ledge or shoulder 30. The peripheral flange is adapted to be received within the chamber 12 so that the ledge 30 rests upon the upper edge 31 of the body 11 as is clearly indicated in Fig. 2 of the drawings. In accordance with the present invention, the cover 28 serves several functions, among which is its function as a measuring device for measuring the correct quantity of water to be placed in the cooking receptacle or chamber 12 for conversion into steam during the cooking operation, the cooking interval being directly determined by the quantity of water employed. It will be understood that when eggs are to be soft boiled or cooked to only a minimum degree that a relatively small quantity of water is required. The smaller the quantity of water that is required to produce the desired cooking interval, the greater the accuracy with which this quantity must be measured to maintain the same percentage error in the desired length of this interval. Accordingly, the cover 28 is of cone shaped configuration with a plurality of steps defined by annular ridges 33. At the apex of the cone shaped cover there is provided a measuring receptacle 32 of small diameter for accurately measuring small quantities of water. Suitable indicia such as "soft," "medium" and "hard" are associated with some of the annular ridges 33 to designate roughly the cooking condition obtained with the particular quantities of water measured by the cover to the level of these associated ridges.

Fig. 3 shows the hand of an operator holding the cover 28 beneath a faucet 35. Depending upon the degree of cooking desired, a predetermined quantity of water is measured with the cover 28 and poured into the cooking chamber 12. Some people, of course, desire their eggs to be cooked harder or softer than the three specific conditions designated by the indicia "soft," "medium" and "hard" on the cover 28, and after using the cooker a few times, may find that a quantity of water between these levels or above or below these levels is most desirable for their taste. In any event, one may quickly determine how to cook the eggs to suit one's taste to perfection. Thereafter, if the eggs are desired to be cooked in the same manner, the same amount of water is measured, regardless of whether one egg or six eggs are to be cooked.

It will be understood that with a cone shaped cover having the small diameter portion 32 at the apex thereof, that any knob attached to the apex in the conventional manner would substantially increase the overall height of the egg cooker 10. In accordance with the present invention there is provided a manipulating knob 38, which is hollow, as is shown best in Fig. 2 of the drawings, to receive completely therein the narrow diameter apex defining the measuring receptacle 32. For the purpose of holding the knob 38 in place on the cover 28, there is molded into the knob 38 a suitable insert 39 having a tubular extension 40 which may be peened over after insertion through an opening at the apex of the conical cover 28. A suitable washer 41 is preferably clamped between the peened over portion 40 and the adjacent surface of the cover 28 to insure against the escape of water when measured therein.

One problem always encountered in boiling eggs heretofore has comprised breakage of the egg shells by virtue of the pressure produced therein during the cooking operation with the resultant spreading of the contents of the egg throughout the cooking utensil and the creation of a rather undesirable odor, to say nothing of the difficulty of cleaning the egg cooker after each cooking operation.

To prevent such breaking of the eggs, it has been suggested that the air pocket, which usually appears at the large end of each egg, be pricked by suitable means, thus affording an escape passageway for any gas or air pressures built up within the egg shell. To accomplish this there is provided, in accordance with the present invention, a piercing needle 42, which is suitably mounted as by a press fit within the insert 39 so as to extend into the cover 28 within the small diameter measuring section 32. With this arrangement, the shell of the egg may be pierced without otherwise damaging the shell since the diameter of the cover 28 near the needle 42 is such as to prevent more than a small portion of the egg to extend into the small diameter chamber 32. This is best shown by dotted lines in Fig. 2 of the drawings where it is noted that the shoulder defining the limits of the measuring section 32 of the cover 28 engage the egg shell and permit the piercing needle 42 merely to prick through the shell. Thus no further damage to the shell than the pricking of the small hole can occur.

For the purpose of supplying the necessary heat to cook the eggs, the automatic egg cooker 12 includes a suitable heating element, generally indicated at 43. Such a heating element is preferably one of the well known sheathed type heating units which conventionally comprises an outer metal sheath within which is disposed a suitable length of resistance wire such, for example, as nichrome wire coiled in the form of a helix. Surrounding this coiled resistance wire within the sheath is a refractory composition indicated at 46 and commonly formed of fused magnesium oxide which centers the resistance element and which furthermore is a good heat conductor and yet a good electrical insulator. Preferably the sheathed heating element 43 is bent into the form of a substantially one turn ring having a diameter somewhat smaller than the diameter of the body 11. Also in accordance with the present invention, this ring comprising the sheathed heating element 43 is cast within a raised rib 44 during the casting operation of the body 11 with the rib 44 disposed in the control chamber 13. The ends of the sheathed heating element are preferably bent downwardly so that suitable rigid terminal portions 45 and 45' defining each end of the resistance element extend in a substantially vertical direction and the fused magnesium oxide or other suitable insulation 46, which is already present in the sheathed heating element, provides the insulation for insulating the ends of the heating element from the conducting portions of the body 11.

In order to supply the heating element 43 with electrical energy in a controlled manner, there are provided a pair of terminal studs 49 and 50 which are clamped to the lower wall portion of the body 11 defining the control chamber 13. Preferably the studs 49 and 50 are insulated by sleeve insulators, not shown, where they pass through the wall of the body 11 and by suitable inner and outer sheet insulators 51 and 52 formed of mica or the like. The studs 49 and 50 are threaded at their inner ends to receive clamping nuts 52' whereby these studs are held in a rigidly supported and insulated manner from the body 11 so as to be capable of being electrically engaged by the female type plug of a conventional power supply cord which is furthermore adapted to be connected to a suitable electrical outlet. For the purpose of facilitating the electrical connection of such a conventional female plug with the terminal studs 49 and 50, the latter are preferably surrounded by a plug guard 54 of conventional configuration. The plug guard 54 furthermore guards the terminal studs 49 and 50 from being damaged through accidental contact with external objects. It will be understood that the above described terminal studs 49 and 50 and their insulated association with the body 11 is conventional.

In accordance with an important feature of the present invention, the control mechanism for controlling the electrical circuit between the terminals 45 and 45' of the heating element 43 and the terminal studs 49 and 50 requires a minimum of insulation. In fact, with the present invention, substantially no insulation, over and above that inherently included, is required. Referring now to Figs. 4 and 5 of the drawings, the terminal 45' of the heating element 43 is connected with the terminal stud 49 by a lead 56 formed of more or less rigid material. The end of this lead is provided with a suitable connection so that it may be clamped by a clamping nut 57 threadedly engaged with the terminal stud 49. The other end of the lead 56 is welded to the terminal 45'. Thus, it is apparent that no additional insulation is required from that already present to complete the electrical circuit between the terminal support 49 and the terminal 45' of the sheathed heating element 43. The electrical circuit between the terminal post 50 and the terminal 45 of the sheathed heating element 43 includes a contact spring bracket 60 suitably clamped to the terminal stud 50 by means of the nut 61. For the purpose of being sure that this bracket 60 does not electrically engage any conducting portions of the body 11, there is preferably provided an insulating spacer illustrated as of annular configuration so as to be slipped over a projecting lug 63 of the rib 44. This insulating disc 62 includes a portion of reduced diameter receivable within an opening defined in the bracket 60.

Supported on the free end of the bracket 60 is a resilient contact spring 65 supporting at its free end a switch contact 66, for electrically engaging a cooperating switch contact 67, supported on a contact lead 69. The contacts 66 and 67 comprise the control switch for controlling the energization circuit of the sheath heating element 43. The contact lead 69 is preferably a rigid member having one end welded or otherwise secured to the terminal 45 and the contact 67 supported at the other end. When the contacts 66 and 67 are in electrical engagement, the electrical circuit through the heating element 43 from the terminal studs 49 and 50 is completed. It may be noted that the only insulation required for this electrical circuit, other than that already present by virtue of the insulated terminal posts 49 and 50 and that insulation 46 normally included in the sheathed heating element 43, is the insulating member 62, which might even be dispensed with since the bracket 60 may be sufficiently rigid and also sufficiently spaced from the rib 44 and other parts of the body 11 to insure the necessary electrical insulation. As illustrated, the contact spring 65 has its end adjacent the bracket 60 riveted thereto as by rivets 69.

For the purpose of automatically controlling the contacts 66 and 67 to open the same when the eggs are cooked to the desired degree and for also permitting the closing of the contacts when it is desired to initiate the cooking operation, there is provided a thermostat assembly comprising a cantilever mounted bimetallic element 70 of somewhat tapered configuration with its high expansion surface at the upper side thereof. The wider end of this bimetallic element 70 is clamped as by means of a suitable clamping plate 71 and fastening means 72 to a ledge 73 comprising an integral part of the casting or body 11. This ledge 73 includes a portion 74 extending in the direction of the bimetallic element 70, and under normal unstressed conditions of the bimetallic element 70 its high expansion surface is adapted to be disposed in intimate heat exchange relationship with the projection 74. Since projection 74 is integral with the floor 11a into which the heating element 43 is cast, the bimetallic element 70 is therefore in intimate heat exchange relationship with the floor 11a and consequently the heating element 43, by virtue of the good heat conductivity of aluminum, from which the body 11 is preferably die cast.

To provide snap acting operation of the contacts 66 and 67 in response to deflection of the bimetallic element 70, there is provided a toggle spring 76 which is fastened to a projection 77 of the body 11 disposed diametrically opposite the projection 74. The toggle spring 76 is suitably fastened to the projection 77 by fastening means or screws 78. The adjacent ends of the cantilever mounted bimetallic element 70 and the toggle spring 76 are effectively interconnected by a flat spring member 79 in the form of a loop or figure eight having integral lateral extensions 79a and 79b projecting from each side of the loop toward the bimetallic element 70 and toggle spring 76 respectively. The extension 79a is riveted to the end of the bimetallic element 70 as indicated at 81. The extension 79b, on the other hand, is provided with bifurcations 82 for cooperating with a somewhat T-shaped end 76a of the toggle spring 76, to provide a toggle hinge or pivot.

To produce the desired snap action, a slight compressive force tending to move the central portions thereof towards each other is applied to the loop spring 79 through the extensions 79a and 79b thereof. This causes the spring 79 to tend to move to either one of two limiting positions thereof. In one of these limiting positions the extension 79b through effective engagement with an insulating projection 82 from contact spring 65, as shown in Fig. 5 of the drawings, produces relative separation of the contacts 66 and 67 by moving the contact 66 away from the stationary contact 67. As illustrated, the insulating projection 82 is supported from the contact spring 65 but it will be obvious that it might equally be supported from the extension 79b.

For the purpose of resetting or reclosing the contacts 66 and 67 when it is desired to initiate a cooking operation, there is provided a control lever 85 having one end suitably connected as by rivets 86 with the extension 79b. The end of this lever 85 projects through a suitable slot 88 defined in the skirt of the body 11 bounding the chamber 13. Preferably the end of the control lever 85 is provided with a suitable control knob 89 formed of molded plastic or the like. Also, suitable indicia, such as "off" and "on" are preferably provided on the exterior of the body 11 adjacent the knob 89, as is clearly shown in Figs. 1 and 6 of the drawings, whereby the operator may know at a glance the operating condition of the egg cooker 10.

To protect the thermostatic control mechanism and prevent the operator from coming in contact with the electric control circuit disposed within chamber 13, there is provided a suitable closure plate 90 adapted to seat on a ledge 92 defined around the inside periphery of the lower edge of the body 11. This plate is preferably attached by suitable fastening means 93 threadedly engaged with tapped openings defined in lugs 94 integrally formed with the body portion 11 during the initial casting operation. Preferably also the fastening means 93 hold in position legs or feet 95 formed of a molded plastic material or the like. Thereby the egg cooker may be placed on any surface without damage to said surface from the heat stored in body 11.

In accordance with the present invention, the floor 11a of the cooking receptacle 12 is inclined, as clearly indicated in Fig. 5 of the drawings, with the deepest portion of the incline directly over the projection 73, to which the end of the thermostat 70 is attached. With this construction it will be apparent that as the water within the chamber 12 is evaporated, the last remaining quantity of water will be disposed over the thermostat support and consequently will maintain the thermostat support and hence the thermostat 70 at a temperature close to the boiling point of water. As soon as all of the water has been evaporated, the temperature of this portion of the bottom will rise rapidly to a temperature of the order of 250° F., whereupon the bimetallic element 70 will move with a snap action to open the circuit at the contacts 66 and 67 and terminate the heating operation.

So that the operator may be made aware of the fact that the egg cooking operation is complete, there is preferably provided an audible signal means specifically illustrated as comprising a clapper member 99 attached to the end of the control lever 85 by the same rivets 86 which fasten the control lever to the extension 79b. The free end of the clapper member 99 strikes the bottom plate 90 when the control switch comprising the contacts 66 and 67 is operated with a snap action to the open position. It will be apparent that the closure plate 90 will provide a sort of sounding board for producing a somewhat ringing sound to indicate the termination of the cooking operation. Any other suitable means for producing such an audible signal may, of course, be employed. It should be noted that the insulating projections 82 on the spring arm 65 actually engages the end of the clapper 99 rather than the extension 79b to which it is riveted.

In view of the detailed description included above, the operation of the egg cooker 10 of the present invention will be readily understood by those skilled in the art and no further discussion thereof is included. In initiating a cooking operation, the eggs taken either directly from a refrigerator or from some other place and are pierced by the piercing needle 42 at the large end thereof. Thereafter, the eggs are positioned by the locating disc 16, and if six eggs are to be cooked, the sixth egg is placed on the raised platform 20. Then the proper quantity of water is measured by the cover 28 and placed within the receptacle or chamber 12. The same amount of water, determined by the cooking interval desired, is used regardless of the number of eggs to be cooked. The cover is then placed on the egg cooker and the control knob 89 pushed to the "on" position. The latter step is preferably performed after the electrical cord, not shown, connected to the terminal studs 49 and 50 is connected to a source of electrical energy. The cooking of the eggs will then begin and if the eggs are cold, the evaporated water will condense coming in contact with the cold eggs without substantially any steam escaping until the eggs are heated so they no longer act as steam condensers. Thereafter, cooking continues with the steam escaping at the juncture between the cover 28 and body 11. When all the water is evaporated, the thermostat opens the circuit with a snap action and the clapper 99 produces an audible signal indicating that the eggs should be removed to insure that they are cooked to exactly the right condition.

Figure 8:
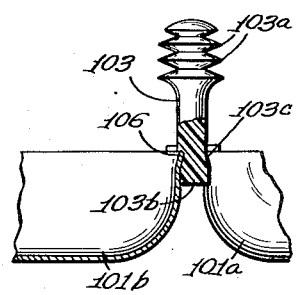
Fig. 8 is a sectional view taken on line 8—8 of Fig. 7, assuming that Fig. 7 shows the complete structure.

With little change, the egg cooker of the present invention may also be used for poaching purposes and to this end the locating disc 16 is preferably constructed as indicated in Fig. 6 of the drawings, and designated by the reference numeral 16'. This disc 16' has a plurality of upwardly extending projections 100 for supporting a poaching pan generally designated at 101 and comprising three individual sections 101a, 101b and 101c of somewhat pie-shape, which may be riveted or spot welded together in the manner indicated in Figs. 6 and 7 of the drawings. These three pans united in this manner form a unitary structure which is supported by the lugs 100. For the purpose of handling the poaching pan 101 when it is hot, a suitable handle 103 formed of a molded plastic or the like and having ridges 103a readily graspable by the operator is provided. The lower end of the handle 103 has a cross section such as is clearly shown at 103b in Fig. 7 of the drawings, which seats within the space defined between the individual sections 101a, 101b and 101c at the central juncture between the three sections. The portion of the handle 103 inserted in the space between the pan sections is undercut, as indicated at 103c in Fig. 8 of the drawings, at three spaced points so that by a slight deformation indicated at 106 of the three pan sections 101a, 101b and 101c, the handle 103 may be securely locked in place.

The operation of the poaching pan for poaching eggs is no different from the egg cooking operation described heretofore. In poaching the eggs, the poaching pan is disposed in the position shown in Figs. 6 and 7. The eggs to be poached are removed from their shells and dropped into the sections of the poaching pan 101, one egg to a section. Thereafter, the cooking operation is the same as when boiling the eggs, and upon completion of the poaching operation, the cover 28 is removed, whereupon the operator has ready access, by virtue of the handle 103, to the poaching pan 101 for removal of the eggs therefrom.

While there has been illustrated and described what is at present considered the preferred embodiment of the present invention, it will be understood that numerous changes and modifications will occur to those skilled in the art. It is aimed in the appended claims to cover all such changes and modifications as fall within the true spirit and scope of the present invention.

What is claimed as new and desired to be secured by Letters Patent of the United States is:

1. In a device for boiling eggs of the type comprising an egg cooking chamber of circular cross section having electrical heating means in heat transfer relationship with the cooking chamber, the combination of means for supporting a plurality of eggs in said chamber with the longitudinal axes of said eggs all disposed in a substantially vertical direction and with said eggs arranged in a circle around the center of said chamber, the diameter of said circle being such that an insufficient space remains at the center to support an egg in said space at the level of said plurality of eggs when said plurality of eggs are supported by said first mentioned means, and raised supporting means at the center of said chamber for supporting an additional egg above the level of said plurality of eggs whereby a maximum number of eggs may be supported in a minimum cross sectional area.

2. The device of claim 1 wherein manually actuatable switch means for rendering said heating means effective are provided and thermal responsive means for terminating the cooking operation upon completion thereof are also provided.

3. In a device for boiling eggs of the type comprising an egg cooking chamber of circular cross section having electrical heating means in heat transfer relationship with the cooking chamber, the combination of means for supporting a plurality of eggs in said chamber with the longitudinal axes of said eggs all disposed in a substantially vertical direction and with said eggs arranged in a circle around the center of said chamber, the diameter of said circle being such that an insufficient space remains at the center to support an egg in said space at the level of said plurality of eggs when said plurality of eggs are supported by said first mentioned means, raised supporting means at the center of said chamber for supporting an additional egg above the level of said plurality of eggs whereby a maximum number of eggs may be supported in a minimum cross sectional area, manually actuatable switch means for rendering said heating means effective, thermal responsive means for terminating said cooking operation upon completion thereof, and an audible signal comprising a member actuated by said thermal responsive means for indicating that the heating operation has been terminated.

References Cited in the file of this patent
UNITED STATES PATENTS

| Number | Name | Date |
|---|---|---|
| 133,205 | Crutchfield | Nov. 19, 1872 |
| 153,159 | Dinwiddie | July 21, 1874 |
| 615,238 | Barron | Dec. 6, 1898 |
| 826,843 | Gaillard | July 24, 1906 |
| 1,046,888 | Stanley | Dec. 10, 1912 |
| 1,055,882 | Cubitt | Mar. 11, 1913 |
| 1,178,525 | Lawrence | Apr. 11, 1916 |
| 1,548,242 | Anderson | Aug. 4, 1925 |
| 1,727,842 | Stallworth | Sept. 10, 1929 |
| 1,814,754 | James | July 14, 1931 |
| 1,850,131 | Mennicke | Mar. 22, 1932 |
| 1,913,442 | Hanks | June 13, 1933 |
| 2,009,790 | Shroyer | July 30, 1935 |
| 2,010,664 | Hanks | Aug. 6, 1935 |
| 2,057,421 | Dickson | Oct. 13, 1936 |
| 2,175,727 | Graham | Oct. 10, 1939 |
| 2,244,580 | Smith | June 3, 1941 |
| 2,267,387 | Winborne | Dec. 23, 1941 |
| 2,312,555 | Jepson | Mar. 2, 1943 |
| 2,404,130 | Frank | July 16, 1946 |
| 2,518,566 | Osterheld | Aug. 15, 1950 |
| 2,545,308 | Ritchie | Mar. 13, 1951 |
| 2,553,880 | Stigler | May 22, 1951 |
| 2,571,782 | Swenson | Oct. 16, 1951 |
| 2,576,432 | Wilcox | Nov. 27, 1951 |
| 2,690,709 | Farr et al. | Oct. 5, 1954 |